Patented Aug. 14, 1928.

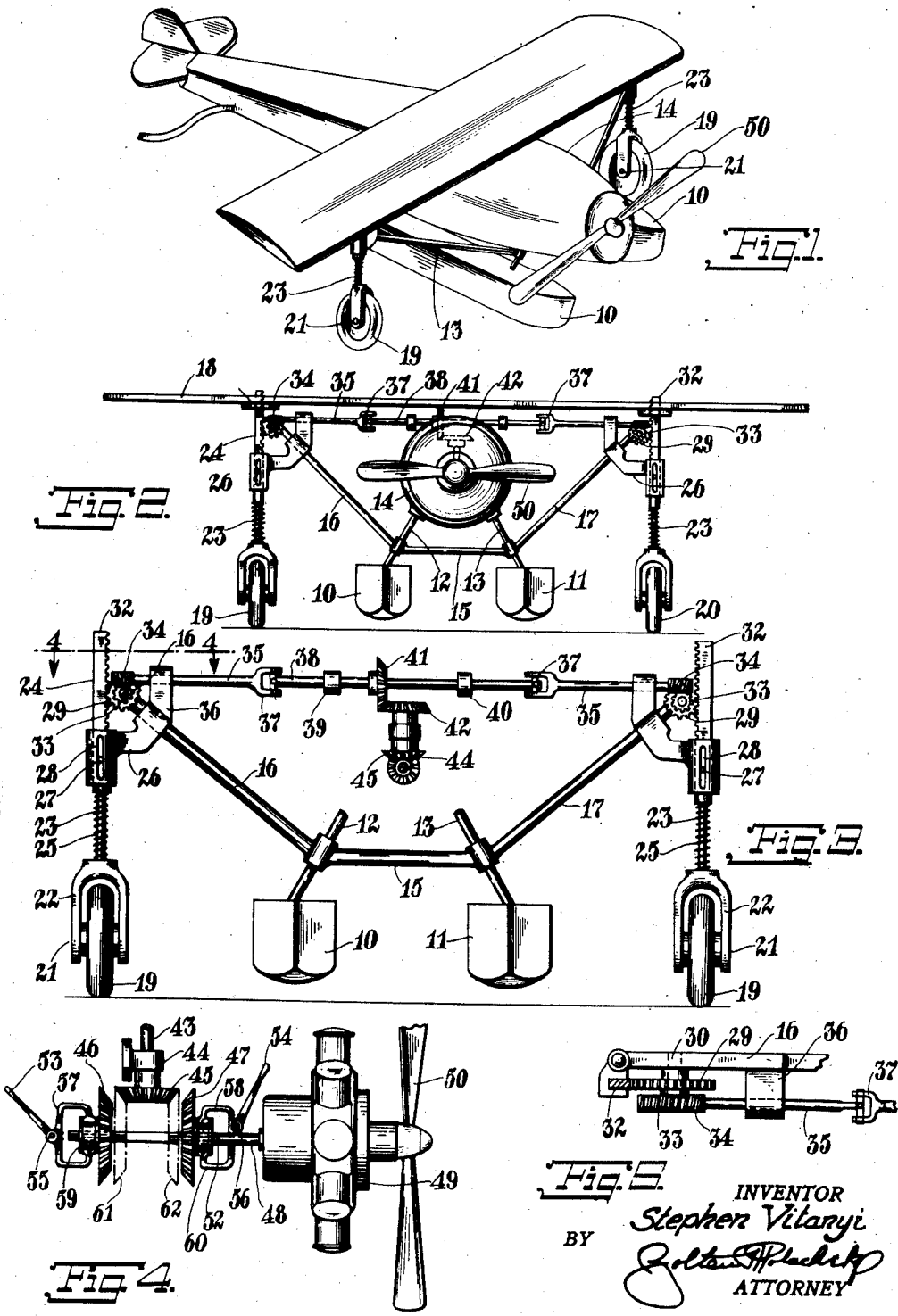

1,681,071

UNITED STATES PATENT OFFICE.

STEPHEN VITÁNYI, OF ROCKAWAY BEACH, NEW YORK.

SEA AND LAND AEROPLANE.

Application filed July 7, 1927. Serial No. 203,994.

This invention relates generally to improvements in aeroplanes, and in particular to an adjustable landing gear adapted to be readily and easily positioned so as to permit an aeroplane to alight on land or on water.

The object of the invention is to provide an adjustable landing gear of novel construction and arrangement of parts hereinafter more fully described, claimed and illustrated in the accompanying drawing.

Fig. 1 is a perspective view of a monoplane equipped with my improved device.

Fig. 2 is a front elevational view thereof.

Fig. 3 is an enlarged fragmentary view illustrating in particular the method of attaching my improved device to the underbody of an aeroplane.

Fig. 4 is a sectional view taken on the line 4—4 of Fig. 3.

Fig. 5 is a side elevational view of the driving mechanism as embodied in my improved device.

As here embodied my improved device comprises pontoons 10 and 11, secured to the lower extremities of the struts 12 and 13, which are secured to, and extended downwardly from the body 14 of an aeroplane. A transverse strut 15 extending intermediate the struts 12 and 13 and secured thereto. Side struts 16 and 17 are secured intermediate to the struts 12 and 13 and extended upwardly therefrom, angularly, and are secured to the wing 18 of the aeroplane. The above described construction is such as will permit the struts to support the said pontoons, so as to permit the said aeroplane to alight on water.

In the accompanying drawing I have illustrated a monoplane, such as commonly used for flying. It should be understood that I do not necessarily limit the use of my invention to aeroplanes of this type, but to all classes and styles of aeroplanes, such as used for commercial, or pleasure purposes, or in time of war.

The wheels 19 and 20, comprise the usual rubber tired wheels, such as ordinarily used in connection with aeroplanes for alighting on land. The said wheels are rotatively mounted on the shafts 21, mounted in the fork members 22. The fork members 22, are slidably mounted on the vertical shafts 23, which are provided with enlarged extended portions 24. The expansion springs 25 are wound or positioned on the shaft 23, so as to normally hold the wheels 19 and 20, in a downwardly extended position. The above described construction is such as will provide a certain amount of resiliency to the wheels, so as to eliminate shocks when landing on land. The shafts 23 are slidably mounted on the brackets 26, secured to the struts 16 and 17. Pins 27 are secured to and extended from the shafts 24, engaging in elongated apertures 28, formed in the brackets 26, so as to hold the shafts 24 and 25 in a relatively fixed slidable position. The gears 29 are secured to the stub shafts 30, rotatively mounted in the brackets 31, secured to the struts 16 and 17, and mesh with the rack teeth, cut or formed on the enlarged portions 24 of the shafts 23. The worm pinion 33, is secured to the stub shafts 30, and mesh with the worm 34, made integral with the shafts 35, rotatively mounted in the brackets 36, secured to the struts 16 and 17. The usual universal joints 37 are provided, as a means of connecting the shafts 35, to the shaft 38, so as to allow a certain amount of flexibility of the struts 16 and 17, without interfering with the operation of my improved device. The shaft 38 is rotatively mounted in the brackets 39 and 40. The bevel gear 41 is secured to the shaft 38, and meshes with the bevel gear 42, secured to the shaft 43, rotatively mounted in the bracket 44. The bevel gear 45 is secured to the shaft 43.

A pair of bevel gears 46 and 47 are slidably mounted on the crank shaft 48 of the usual motor 49, employed to rotate the usual propeller 50, as a means of driving the said aeroplane.

The crank shaft 48 is secured thereto, and extended therefrom, keys 51 and 52 engaging in apertures formed in the hubs of the bevel gears 46 and 47, respectively, as a means of rotating or driving the gears 46 and 47. The operating levers 53 and 54 are pivotally attached, as at 55 and 56, to any suitable convenient part of the aeroplane, within easy reach of the aviator, and are provided with forked portions 57 and 58, engaging in co-axial recesses, formed in the extended portions 59 and 60 of the gears 46 and 47.

The above described construction is such as will permit the gears 46 and 47 to be slidably engaged with the gears 45, as designated by the reference numerals 61 and 62, so as to lower and raise the said wheels 19 and 20. It should be understood that when the said wheels are lowered as above set forth the said aeroplane may alight on land, the wheels when in a lowered positon extending considerably below the above mentioned pontoons.

While I have illustrated and described the preferred form, construction and arrangement of the several elements employed it will be understood that my device may be equipped on bi-planes and other types of flying machines and that additional pontoons may be provided at the ends of the lower wings of the aeroplane and that my device is, nevertheless, susceptible of considerable modification therein, and I therefore reserve the right and privilege of resorting to all such changes as may be fairly embodied within the spirit and scope of the invention as claimed.

Having thus described my invention, what I claim as new and desire to protect by Letters Patent of the United States is as follows:

1. In a sea and land aeroplane, the combination with inclined struts connected to support pontoons to the wings of the aeroplane, of brackets secured to the said struts, and formed with elongated apertures vertically arranged, vertical shafts slidably arranged in the said brackets, pins secured to and extended from the shafts and engaging in the said elongated apertures, and landing wheels connected to the said vertical shafts, as a means for supporting the said landing wheels so as to be vertically movable.

2. In a sea and land aeroplane, the combination with inclined struts connected to support pontoons to the wings of the aeroplane, of brackets secured to the said struts, and formed with elongated apertures, vertically arranged, vertical shafts slidably arranged in the said brackets, pins secured to and extended from the shafts and engaging in the said elongated apertures, means for holding the vertical shafts in desired extended positions and landing wheels connected to the said vertical shafts, as a means for supporting the said landing wheels so as to be vertically movable.

In testimony whereof I have affixed my signature.

STEPHEN VITÁNYI.